Oct. 2, 1928.
J. MÜRNER
1,686,246
ADJUSTABLE GUIDE
Filed Nov. 29, 1926
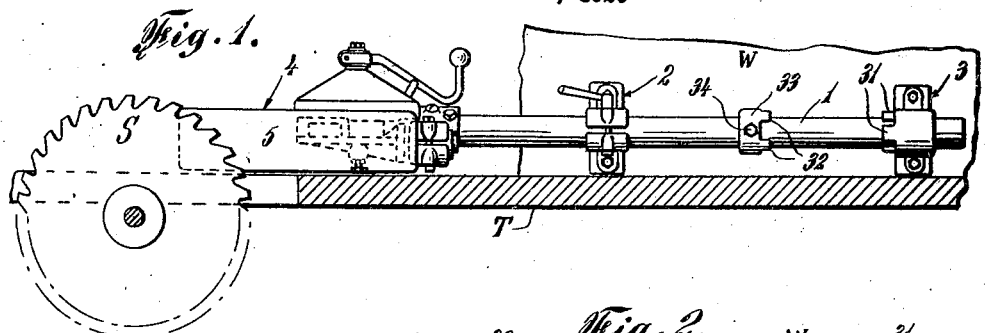
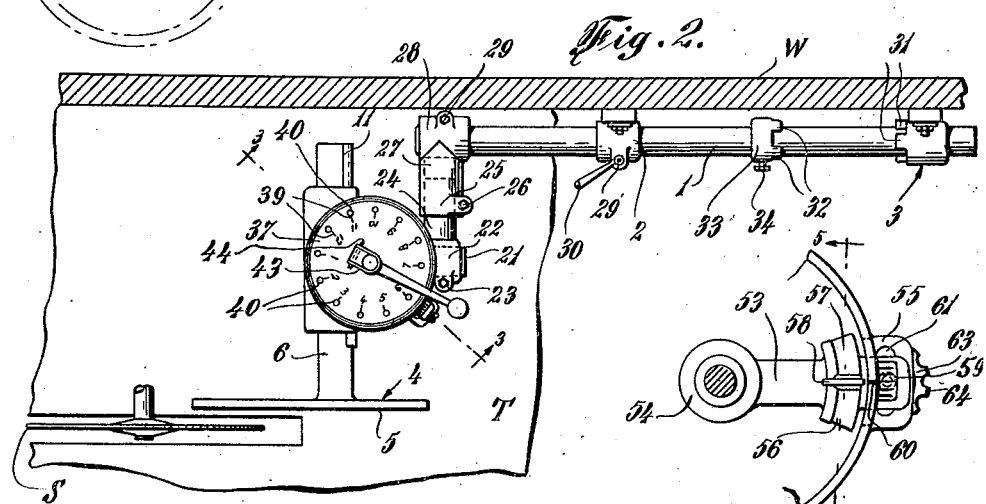
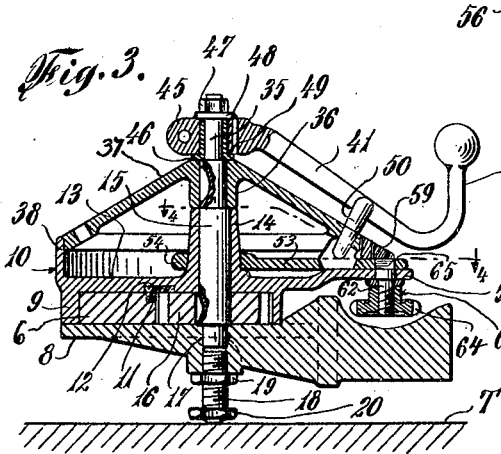
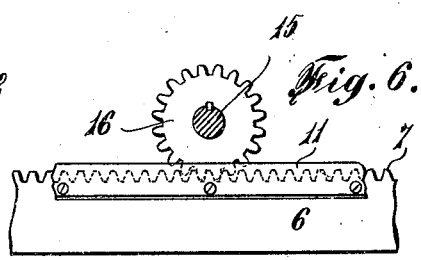
INVENTOR
Johann Mürner.
BY Gustav Drews
ATTORNEY Patented Oct. 2, 1928.

1,686,246

UNITED STATES PATENT OFFICE.

JOHANN MÜRNER, OF STEFFISBURG, SWITZERLAND.

ADJUSTABLE GUIDE.

Application filed November 29, 1926, Serial No. 151,391, and in Switzerland November 30, 1925.

This invention relates to improvements in adjustable guides in general, and more particularly to improvements in adjustable guides particularly adapted for use with rotary saws.

Among the objects of the present invention it is aimed to provide an adjustable guide for cooperation with a rotary saw whereby wood can be cut with parallel sides and the distance for the second cut parallel to the first accurately predetermined.

With the guides heretofore used to cooperate with rotary saws, it has been customary to clamp the guides in place on the work bench. With such guides considerable difficulty has been encountered in accurately determining the location of the guides. The accurate location of the guides was not only necessary in order to produce the required cut, but in addition thereto the accurate location was absolutely essential in order to protect the workmen from injury. If a parallel cut were desired, and the guide were at all inclined relative to the plane of the rotary saw, the piece of wood might jam between the guide and the rotary saw and be engaged by the saw and violently swung into the air, with the consequent danger to the workmen in the immediate neighborhood.

To this end the present invention aims to provide a guide particularly adapted for use in the production of parallel cuts by a rotary saw, which guide may readily and with facility be accurately located and thus positively insure the workmen using such guides against injury. To this latter end, the present invention specifically aims to provide an adjustable guide which can be readily swung out of operative position and there anchored in place until it is desired again to use the same, in which anchored position it is ready to be swung back into operative position and there accurately relocated ready for use.

These and other features, capabilities and advantages of the invention will appear in the sub-joined detail description of one embodiment thereof illustrated in the accompanying drawings, in which Figure 1 is a side elevation;

Fig. 2 is a plan view;

Fig. 3 is a section on the line 3—3 of Fig. 2;

Fig. 4 is a section on the line 4—4 of Fig. 3;

Fig. 5 is a section on the line 5—5 of Fig. 4;

Fig. 6 is an enlarged fragmental view of a portion of the driving connection.

In the embodiment illustrated, there is shown a rotary saw S of usual construction mounted to rotate about a horizontal axis adjacent to the table T, preferably extending from a wall W.

The adjustable guiding device now to be described is preferably connected to the wall W and adapted to cooperate with the table T to be supported thereby in guiding position.

In the present instance, the guiding device is connected to the wall W by means of a shaft 1 journaled in the supports 2 and 3 secured to the wall W. The shaft 1 is adapted to slide longitudinally in said supports 2 and 3, and to oscillate radially therein, the sliding of the shaft to the right permitting the guiding device to be partly withdrawn out of operative relation with the rotary saw S and the oscillation of the guiding device upwardly with the shaft 1, permitting the guiding device to be completely withdrawn out of operative relation with the saw S, so that the saw S, if desired, may then be used for other purposes not requiring the guiding device. In turn, the guiding device may also be oscillated upwardly initially and then moved to the right, there to be temporarily anchored in such upward position.

The guiding device is especially adapted to facilitate the guiding of a piece of wood when it is desired to cut the wood with two accurately parallel faces, spaced from one another at a desired predetermined distance. The present guiding device is equipped to facilitate the ready and accurate adjustment of the guiding device to guide a piece of wood having one face formed, to produce a second face parallel to the first and spaced therefrom at a predetermined distance. The present guiding device is further equipped to permit the ready removal or withdrawal of the device out of operative relation with the saw, and the expeditious and accurate relocation of the guiding device from inoperative relation with the saw into operative relation.

The guiding device is provided with a plate 4, supported with its outer face 5 parallel to the plane of the saw S, and with an adjusting device for accurately positioning the plate 4 at a greater or less distance removed from the plane of said saw S as may be predetermined according to the work required.

The plate 4 is fixed on an arm 6 having a toothed edge 7, see Fig. 6, which arm 6 is mounted to slide on the carrier 8 adjacent to the wall 9 of the housing 10, the carrier 8 being fixedly connected to the shaft 1. The upper face of the arm 6 is provided with a shield 11 extending over and beyond the teeth of the toothed edge 7 to prevent the collection of sawdust therein. The shield 11, see Fig. 3, extends into the recess 12 formed in the upper wall 13 of the housing 10.

The central portion of the upper wall 13 of the housing 10 extends upwardly into the cylindrical hub 14 to form a journal for the vertically extending shaft 15. The shaft 15 is keyed to the gear 16 rotatably mounted between the lower face of the wall 13 and the upper face of the carrier 8, and meshes with the toothed edge 7 of the arm 6. The shaft 15 preferably has a diminished lower end extending into the opening 17 formed in the carrier 8.

For controlling the elevation of the carrier 8 relative to the table T, the stud 18 is screw threadedly connected to the lower end of the opening 17, and provided with a lock nut 19 to anchor the stud 18, the head 20 of the stud 18 resting on the table T when the guiding device is in operative relation with the saw S.

The carrier 8 is connected to the shaft 1 by any suitable means, in the present instance the carrier 8 having an arm 21 clamped in the split sleeve 22 provided with the clamping screw 23, which sleeve 22 is formed at the forward end of a rod 24 clamped in the split sleeve 25 provided with a clamping screw 26, and which split sleeve 25 is formed at the forward end of an arm 27 provided with a split sleeve 28 formed at its rear end and receiving the shaft 1 substantially at right angles to the direction of the arm 27, such sleeve 28 in turn also being provided with a clamping screw 29 to anchor the shaft 1 in the sleeve 28.

From the foregoing it will be seen that when the shaft 1 is moved to the right, the guiding plate 4 will therewith be moved to the right and out of operative relation with the saw S, and that the guiding device including the guiding plate 4 may be swung upwardly against the wall W, about the axis of the shaft 1.

For anchoring the guiding device in its left hand position in operative relation with the saw S, against accidental displacement, the journal 2 is preferably composed of a split sleeve having a clamping screw 29' provided with the handle 30 whereby the screw 29' may with facility be actuated to clamp the shaft 1 against displacement in the journal 2.

For conveniently and with dispatch anchoring the guiding device in its raised position out of operative relation with the saw S, the journal 3 is preferably provided with the lugs 31 on its left hand annular face to cooperate with the lugs 32 formed on the right hand annular face of the collar 33 mounted on the shaft 1 between the journals 2 and 3, and fixed in place by the set screw 34. In actual practice, when withdrawing the guiding device out of operative relation with the saw S, the handle 30 will first be turned to release the shaft 1, and the guiding device then swung upwardly and moved to the right until the lugs 32 engage the lugs 31, whereby the guiding device will be securely anchored in raised position out of operative relation with the saw S. In turn, when it is desired again to use the guiding device with the saw S, the same will first be moved to the left to disengage the lugs 32 from the lugs 31, and the device again swung downward until the stud head 20 engages the table T, and after the guiding device has been moved to the left to the desired relative position of the plate 4 to the saw S, then the handle 30 is turned to clamp the shaft 1 against further movement.

In order to adjust the plate 4 to space the same from the plane of the rotary saw S the required distance, the gear 16 will be rotated to engage the toothed edge 17 of the arm 6 to actuate the plate 4 a greater or less distance from the plane of the saw S.

In order to predetermine the distance between the plate 4 and the saw S, there are provided the means now to be described.

To the upper diminished end 35 of the shaft 15, there is keyed the hub 36 of the conically shaped downwardly flaring dome 37 the lower periphery of which extends to the inner face of the annular upwardly extending wall 38 of the housing 10. The upper face of the dome 37 is provided with graduations 39, in the present instance twelve in number, and numbered from 1 to 12. For each graduation 39 there is provided an orifice 40.

For rotating the dome 37 and therewith the gear 16, the lever 41 is provided having a handle portion 42 extending upwardly at the free end thereof. The lever 41 is provided with a bifurcated end 43, the ends of which are pivotally connected to the pin 44 on the bearing 45 rotatably mounted on the sleeve 46 mounted on the upper diminished end 35 of the shaft 15. The upper end of the shaft portion 35 is screw threaded to receive the nut 47 to engage the washer 48 and anchor the bearing 45 against axial displacement between the washer 48 and the shoulder 49 on the sleeve 46.

The handle 41, see Fig. 5, is provided with a lateral and downwardly extending finger 50, having an intermediate cylindrical portion 51 and a tapering end portion 52. The handle 41 is adapted to be swung upwardly about the pin 44 to withdraw the finger 50 from an orifice 40 and then to be turned about the dome 37 until the orifice 40 desired registers with the finger 50, whereupon the finger 50 is inserted in such orifice and the handle then turned to a fixed given point, turning therewith the dome 37 and the gear 16 to advance or withdraw the plate 4 relative to the plane of the saw S.

In order to anchor the handle 41 in the predetermined adjusted position, and to provide a fixed given point relative to which the dome 37 may be turned, there is provided an arm 53 having a hub 54 engaging the hub 14 of the housing 10. The outer free end of the arm 53 is adjustably secured to the extension 55 of the housing 10. Adjacent the inner periphery of the annular wall 38, the arm 53 is provided with two cam faces 56 and 57 inclining upwardly toward one another and spaced from one another by the radially extending recess 58. In practice, the cam faces 56 and 57 will extend into the path of movement of the tapered end 52 of the finger 50, so that when the handle 41 is swung in a clockwise or counter-clockwise direction, the cam face 57 or cam face 56 respectively will be engaged and permit the finger 50 to travel upwardly and into the recess 58 where the handle 41 will be anchored, such recess 58 cooperating with the handle 41 to provide the fixed given point aforementioned.

In order to facilitate adjusting the arm 53 so that the graduations 39 will correspond to given distances between the plate 4 and the plane of the saw S, a graduated block 59 is secured to the upper face of the free end of the arm 53 adjacent to the outer periphery of the wall 38. Such wall 38, see Fig. 4, is also provided with a mark 60 relative to which the graduations on the block 59 may be sighted.

The graduations on the block 59 are provided to afford an extremely fine adjustment. As an instance, if the distance of movement of the arm 6 corresponds to a lesser distance than the distance of rotation between the two adjacent orifices 40, the arm 53 may be moved over so that any of the graduations on the block 59 other than the middle one register with the mark 60, in which case the recess 58 will not register with the mark 60.

The extension 55 is provided with an arcuate slot 61 through which the downwardly extending pin 62 of the arm 53 extends. The lower end of the pin 62 is screw threadedly connected to the set screw 63, having a notched head 64 whereby the arm 53 may be locked against movement relative to the extension 55. To prevent rotation of the pin 62 and therewith the displacement of the block 59, the portion 65 of the pin 62 which travels in the slot 61 is preferably angular.

The downwardly flaring outer face of the dome 37 facilitates reading the graduations thereof, and at the same time serves as a chute for the sawdust which will readily slide off such downwardly flaring face, thus to ensure the legibility of the graduations of such face.

In order to protect the gear 16 from the sawdust, the wall 13 of the housing 10 is provided with a downwardly extending wall 66 which engages the carrier 8 to enclose the gear 16 and prevent the sawdust from collecting in between the teeth of said gear.

It is obvious that various changes and modifications may be made to the details of construction without departing from the general spirit of the invention as set forth in the appended claims.

I claim:

1. The combination with a rotary saw, of a support, and a guide for guiding a piece of wood during the cutting of a parallel face by said saw and mounted on said support, said support being pivotally mounted about an axis parallel to the path of movement of the saw and longitudinally slidable relative to said saw whereby said guide may be moved longitudinally relative to said saw and swung upwardly out of operative relation with said saw.

2. The combination with a rotary saw, of a support, a guide for guiding a piece of wood during the cutting of a parallel face by said saw and mounted on said support, said support being pivotally mounted about an axis parallel to the path of movement of the saw and longitudinally slidable relative to said saw whereby said guide may be moved longitudinally relative to said saw and swung upwardly out of operative relation with said saw, and means for temporarily anchoring the guide in said inoperative relation with said saw.

3. The combination with a rotary saw, of a guide for guiding a piece of wood during the cutting of a parallel face by said saw, an arm for supporting said guide, a vertically extending shaft, a gear fixed on said shaft, a toothed edge on said arm in mesh with said gear, a dome fixed on said shaft and having graduations, the graduations indicating the distance of the space between the guide and the saw corresponding to the position of the gear, a bracket rotatably mounted on the upper end of said shaft which extends above and through the apex of said dome, a handle pivotally connected to said bracket, a finger on said handle, and there being a plurality of orifices in said dome adapted to receive said finger whereupon the rotation of said handle will actuate said dome in turn to actuate said gear.

4. The combination with a rotary saw, of a guide for guiding a piece of wood during the cutting of a parallel face by said saw, an arm for supporting said guide, a vertically extending shaft, a gear fixed on said shaft, a toothed edge on said arm in mesh with said gear, a dome fixed on said shaft and having graduations, the graduations indicating the distance of the space between the guide and the saw corresponding to the position of the gear, a bracket rotatably mounted on the upper end of said shaft which extends above and through the apex of said dome, an arm forming a fixed given point relative to which said dome is rotated, and a handle pivotally connected to said bracket and adapted to operatively connect said dome and said gear whereby the actuation of said handle will in turn actuate said gear, said handle cooperating with said arm to anchor the dome in adjusted position.

5. The combination with a rotary saw, of a guide for guiding a piece of wood during the cutting of a parallel face by said saw, an arm for supporting said guide, a vertically extending shaft, a gear fixed on said shaft, a toothed edge on said arm in mesh with said gear, a dome fixed on said shaft having graduations, the graduations indicating the distance of the space between the guide and the saw corresponding to the position of the gear, an arm forming a fixed given point relative to which said dome is rotated, a bracket rotatably mounted on the upper end of said shaft which extends above and through the apex of said dome, a handle pivotally connected to said bracket and adapted to operatively connect said dome and said gear whereby the actuation of said handle will in turn actuate said gear, said handle cooperating with said arm to anchor the dome in adjusted position, and means for adjusting the position of said arm to correspond to the distances to be determined.

6. The combination with a rotary saw, of a journal, a shaft slidably and rotatably mounted in said journal, a guiding device mounted on said shaft and adapted to guide a piece of wood during the cutting of a parallel face by said saw, said shaft being slidably mounted in a path parallel to the path of movement of the saw, a collar on said shaft, lugs on one end of said collar, and other lugs on said journal adapted to cooperate with the lugs on said collar to anchor said guiding device in a raised position out of operative relation to said saw.

7. The combination with a rotary saw, of a guide for guiding a piece of wood during the cutting of a parallel face by said saw, a pivotally mounted support for said guide whereby said guide can be swung out of operative relation to said saw and again returned to operative relation with dispatch, said support being pivotally mounted about an axis parallel to the path of movement of the saw, and an adjustable stud on said support for supporting said support when in operative position relative to said saw.

8. The combination with a rotary saw, of a guide for guiding a piece of wood during the cutting of a parallel face by said saw, an arm for supporting said guide, a vertically extending shaft, a gear fixed on said shaft, a toothed edge on said arm in mesh with said gear, a dome fixed on said shaft having graduations, the graduations indicating the distance of the space between the guide and the saw corresponding to the position of the gear, a bracket rotatably mounted on said shaft, a handle pivotally connected to said bracket, a finger on said handle, and there being a plurality of orifices in said dome adapted to receive said finger whereupon the rotation of said handle will actuate said dome in turn to actuate said gear, said dome being cone shaped and the upper face thereof flaring downwardly to facilitate reading the graduations thereon and forming a chute to permit the ready deflecting of sawdust therefrom.

JOHANN MÜRNER.